United States Patent [19]

Kamata et al.

[11] 4,401,922
[45] Aug. 30, 1983

[54] CONVERGENCE DISTORTION CORRECTION METHOD AND APPARATUS FOR COLOR CATHODE-RAY TUBE

[75] Inventors: Yasuji Kamata; Hiroshi Kuwahara, both of Hitachi; Jushi Ide, Mito; Kenkichi Yamashita, Katsuta; Koji Takahashi, Mobara, all of Japan

[73] Assignee: Hitachi, Ltd., Tokyo, Japan

[21] Appl. No.: 391,916

[22] Filed: Jun. 24, 1982

[30] Foreign Application Priority Data

Jun. 24, 1981 [JP] Japan .................. 56-98988

[51] Int. Cl.³ .................. H01J 29/70; H01J 29/76
[52] U.S. Cl. .................. 315/368; 315/13 C
[58] Field of Search ............. 315/368, 13 C; 358/10

[56] References Cited

U.S. PATENT DOCUMENTS 4,203,051  5/1980  Hallett et al. .................. 315/368
4,203,054  5/1980  Sowter .................. 315/13 C

*Primary Examiner*—Theodore M. Blum

*Attorney, Agent, or Firm*—Antonelli, Terry & Wands

[57] ABSTRACT

In a convergence distortion correction method and apparatus for raster-scanned color CRT having a dynamic convergence magnet assembly, the CRT display screen is divided into a plurality of zones. A digital memory is provided with a data storage field and a flag bit field at each address. Addresses of the zones are generated by means of a sync signal regenerated from an input video signal. First, the addresses of zones to be subjected to the adjustment of convergence distortion are selected to set flags in the flag bit fields of the digital memory at its addresses specified by the selected zone addresses. Then, by referring to the flags, guide patterns are displayed on the selected zones and are used to adjust the convergence distortions in those zones. Preferably, one of the displayed guide patterns is flickered. Correction data based on the results of the adjustment are stored in the data storage fields of the digital memory at the corresponding addresses. Correction data for zones other than the selected zones may be interpolated from the correction data for the selected zones.

17 Claims, 22 Drawing Figures

F I G. 7A
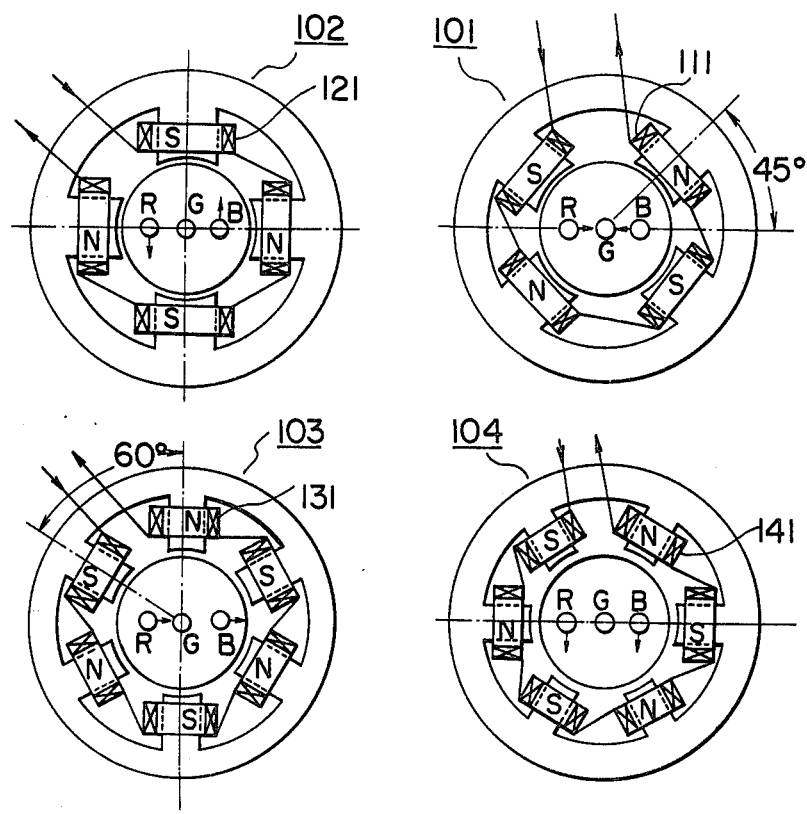
F I G. 7B
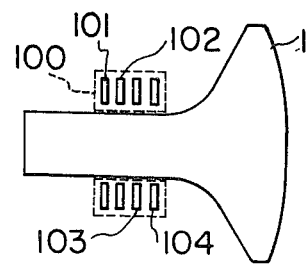

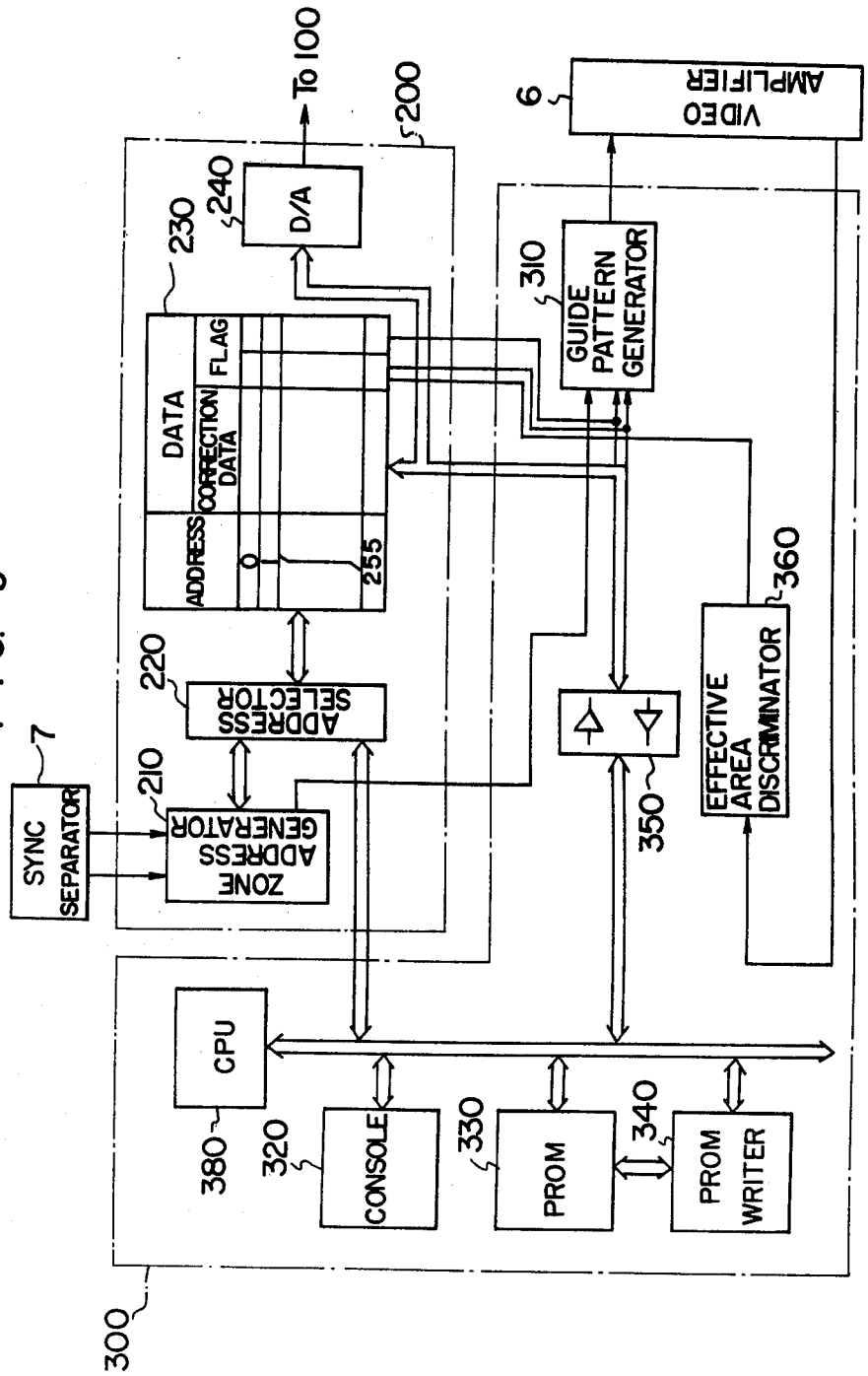

CONVERGENCE DISTORTION CORRECTION METHOD AND APPARATUS FOR COLOR CATHODE-RAY TUBE

The present invention relates to convergence distortion correction method and apparatus for a color cathode-ray tube (hereinafter referred to CRT).

A color CRT display of a television receiver is usually constructed as shown in FIG. 1. On a CRT 1 are mounted a static convergence magnet assembly 2, an auxiliary magnet 8, a horizontal deflection coil 3 and a vertical deflection coil 4. R, G and B signals of an input video signal 9 are applied through a video amplifier circuit 6 to three electron guns of the CRT 1 corresponding to red (R), green (G) and bluw (B), respectively. A sync signal is regenerated through the separation from the input video signal 9 and the shaping in a sync separator circuit 7 and applied to the horizontal and vertical deflection coils 3 and 4 as deflection currents through a deflection circuit 5 to effect raster scan.

A portion of the CRT 1 which relates to the convergence function is shown in FIG. 2 which shows a horizontal sectional view of the CRT 1. The three electron guns (cathodes) for R, G and B are horizontally arranged at a tube neck portion 11 and electron beams 13 emitted therefrom are deflected by the horizontal deflection coil 3 and produce light spots on a display screen 12.

It is desirable that the R, G and B electron beams coincide so that the coincident light spot on the display screen 12 is white when the beams are of equal intensity. In actual, however, the light spots do not coincide but a convergence distortion in the order of several millimeters is included because of a mechanical tolerance and a distortion of deflection magnetic fields. The same is true for the vertical convergence. Typical examples of the convergence distortion are shown in FIG. 3 which is a front view of the display screen 12. In FIG. 3, the display screen 12 is divided into nine zones. The degree of convergence distortion differs from zone to zone.

In the prior art, in order to correct the convergence distortion, the static convergence magnet assembly 2 is coaxially arranged as shown in FIG. 2, which comprises a first four-pole magnet 21, a second four-pole magnet 22, a first six-pole magnet 23 and a second six-pole magnet 24 (see FIG. 4). As shown in FIG. 4, those magnets deflect the beams R and B other than the central beam G in the directions shown by solid line arrows, respectively, by magnetic lines of force H generated thereby. Those four magnets are rotatable around the beams as shown by arcuate broken line arrows ROT so that the deflection directions of the beams R and B may be changed as shown by broken line arrows of FIG. 4 by the rotation of the magnets. Accordingly, the convergence distortion can be corrected by appropriately setting the rotation angles of the magnets.

FIG. 5 shows a manner of the correction of the convergence distortion in, a central display zone (H1, V1) of FIG. 3 by the static convergence magnet assembly 2. In the central display zone (H1, V1), the R, B and G light spots coincide, but in the upper left display zone (H0, V0), the R, G and B light spot do not coincide because of the initial convergence distortion as shown in FIG. 3. In order to compensate a difference between the convergence distortions of different display zones, the auxiliary magnet 8 is arranged around the deflection coils 3 and 4 and it is adjusted in a trial and error method. This method is time consuming and a degree of convergence distortion after such a correction is in the order of 0.7 millimeters as a whole (that is, the spot is not white but includes an appreciable convergence distortion). Thus, this method cannot improve an image quality.

The above static convergence method has been widely adopted in a color CRT having an in-line arrangement of electron guns. On the other hand, in a color CRT having a delta arrangement of electron guns, a dynamic convergence method has been usually adopted.

In the typical dynamic convergence method, a dynamic convergence magnet assembly having three radial convergence coils for radially shifting the R, B and G beams and a lateral convergence coil for laterally shifting the B beam is provided. Normally, a dynamic convergence signal is produced by appropriately converting a horizontal deflection output signal and a vertical deflection output signal from the deflection circuits to supply a correction current to the coils. Since the convergence distortion principally is proportional to square of a deflection distance, the dynamic convergence signal can be calculated based on a parabolic curve. In actual, however, the convergence distortion cannot be corrected by a simple parabolic curve and a long time is required to correct the convergence distortion.

Apart from the analog dynamic convergence distortion correction techniques described above, a digital correction technique to achieve more accurate convergence distortion correction is disclosed in U.S. Pat. No. 4,203,051. The correction technique disclosed therein relates to a color CRT having a delta electron gun assembly and a dynamic convergence magnet assembly which comprises three radial convergence coils and a lateral convergence coil. The CRT display screen is divided into a plurality of zones and digital correction factor signals for the respective zones are stored. Each of the correction factor signals comprises a basic correction component and a fine correction component, and a first digital memory for storing the former and a second digital memory for storing the latter are provided. The basic and fine correction components are previously calculated to provide the convergence distortion correction. When a zone is scanned, the related basic correction component is applied to the radial convergence coils and the related fine correction component is applied to the lateral convergence coil, through D/A (digital to analog) converters under the control of a control logic. In the example disclosed therein, the display screen is divided into $8 \times 8 = 64$ zones, and four basic correction components and a fine correction component, for each zone, are stored in the first memory and the second memory, respectively. The patent, however, does not teach how the fine correction components are entered in the second memory or how the convergence distortion for each zone is preliminarily adjusted.

The content of the second memory can be modified by an operator through a CRT display terminal. To this end, the display terminal has a plurality of registers and an address decoder which indicates a zone address of a zone which is selected by the operator for modification and sends it to a control logic. When the control logic receives the zone address from the address decoder, it causes R, B and G grids to be displayed on the corresponding zone and fetches the data of the corresponding zone address from the second memory and loads it in the registers. The display terminal further has a set of four-way toggle keys for shifting the displayed R and G grids upwardly, downwardly, leftwardly and rightwardly to align those grids with each other, and another set of four-way toggle keys for shifting the aligned R/G or yellow grid and the B grid upwardly, downwardly, leftwardly and rightwardly. Those keys are connected to the registers. The contents of the registers are modified depending on the manipulation of the toggle keys in the course of the correction to finally align the yellow grid with the B grid to obtain a desired correction, and the data thus modified are retransferred to the second memory through the control logic and stored therein.

It is an object of the present invention to provide novel convergence distortion correction method and apparatus for a color CRT which adopts a dynamic convergence.

In the present invention, the display screen of the color CRT is divided into a plurality of zones for effecting the convergence distortion correction. A sync signal is regenerated from an input video signal and a zone address generator repetitively generates zone addresses by means of the sync signal. A digital memory having a data storage field and a flag bit field at each address is provided. Some of the plural zones of the CRT display screen for which the adjustment of convergence distortion is to be made are selected and flags are set at the flag bit fields of the addresses of the digital memory corresponding to the addresses of the selected zones. Guide patterns are displayed on the selected zones of the CRT by referring to the flags from the digital memory. The convergence distortions in the selected zones are adjusted while watching the guide patterns displayed thereon and appropriate correction data determined based on the result of the adjustment are stored in the data storage fields at the corresponding addresses of the digital memory.

In the actual use of the color CRT, the content of the digital memory at the address corresponding to the zone currently scanned is read out under the control of the zone address generator, and it is digital-to-analog converter applied to selected ones of the dynamic convergence coils.

The input signal necessary for the convergence distortion correction in accordance with the present invention is only the video signal as in the case of a conventional color monitor, and an interface of a main unit need not be modified.

The preferred embodiments of the present invention will now be described in conjunction with the accomprnying drawings, in which:

FIGS. 7A and 7B and FIGS. 8A, 8B and 8C show dynamic convergence magnet assemblies suitable for use in the present invention;

FIG. 9 shows a configuration of a convergence distortion correction circuit and an adjustment circuit of the apparatus shown in FIG. 6;

Figure 1:
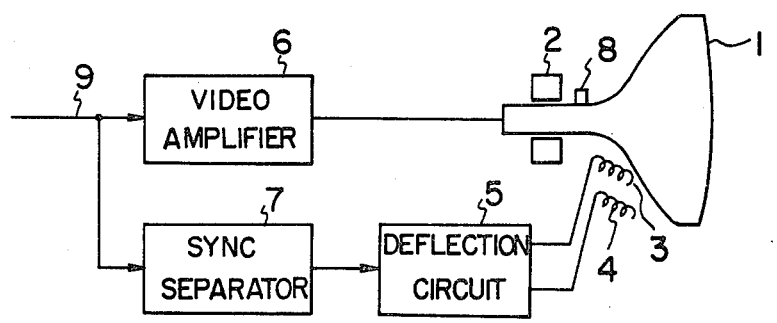
FIG. 1 shows a block diagram of a color CRT display in accordance with the prior art.
Figure 2:
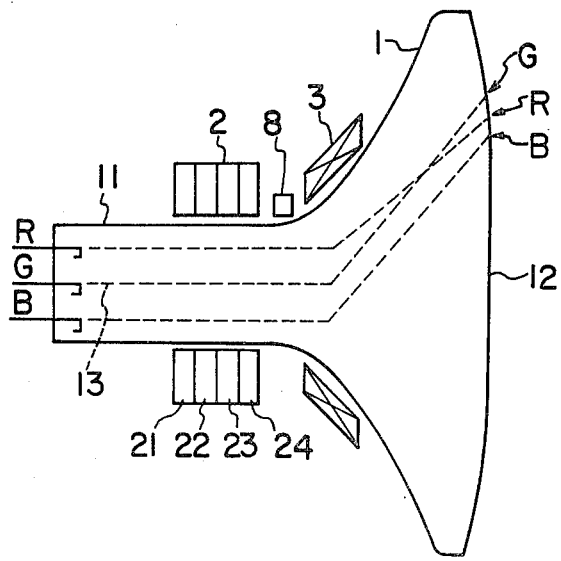
FIG. 2 shows a structure of a color CRT shown in FIG. 1.
Figure 3:
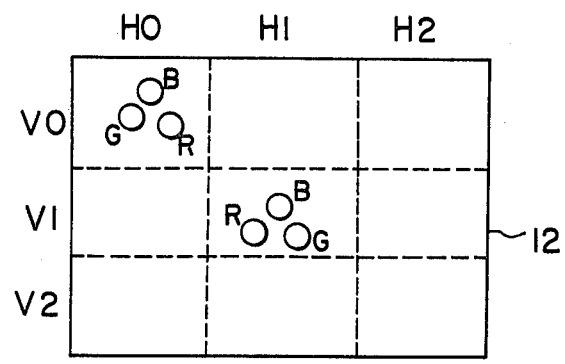
FIG. 3 illustrates typical examples of convergence distortion in the prior art.
Figure 6:
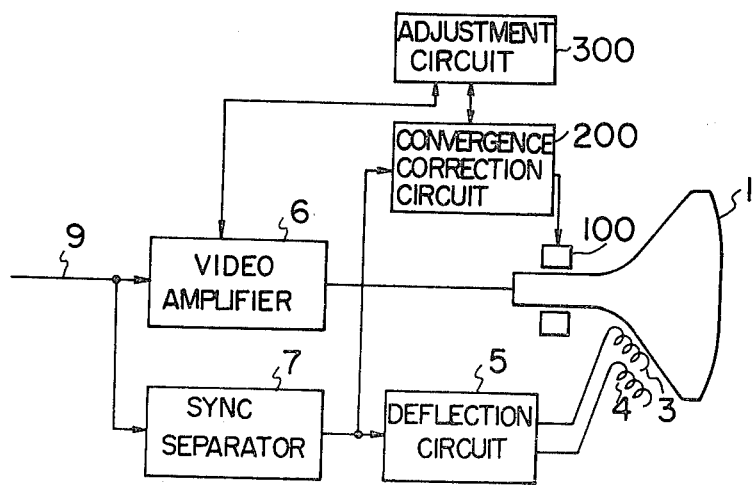
FIG. 6 shows a block diagram of one embodiment of a convergence distortion correction apparatus in accordance with the present invention.

FIG. 6 shows a schematic block diagram of one embodiment of the convergence distortion correction apparatus of the present invention. It differs from FIG. 1 in that a dynamic convergence magnet assembly 100 instead of the static convergence magnet assembly is used to correct the convergence distortion, that a convergence distortion correction circuit 200 is provided to supply a correction signal (current correction) to the magnet assembly 100 in synchronism with beam scan, that an output of a sync separator circuit 7 which produces a sync signal for a deflection circuit 5 is supplied to the correction circuit 200, and that an adjustment circuit 300 for supplying a correction data to the correction circuit 200 is provided. In actual use of a color CRT 1, the adjustment circuit 300 is independent.

The magnet assembly 100 is first explained. While the present invention is applicable to any type of color CRT, a color CRT having an in-line electron gun assembly is specifically explained in the following description.

Figure 4:
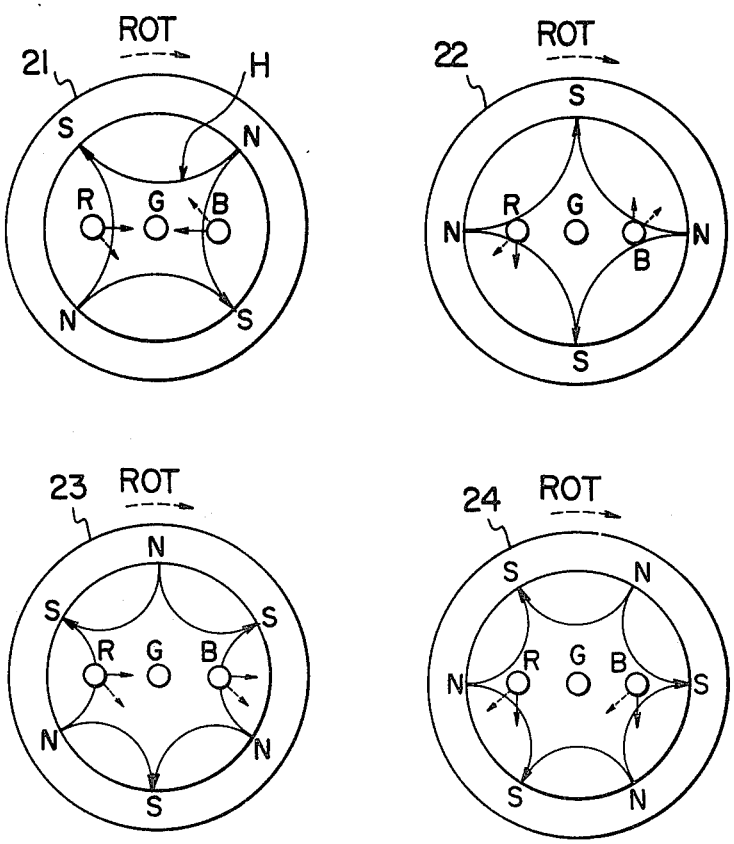
FIG. 4 shows a static convergence magnet assembly.
Figure 5:
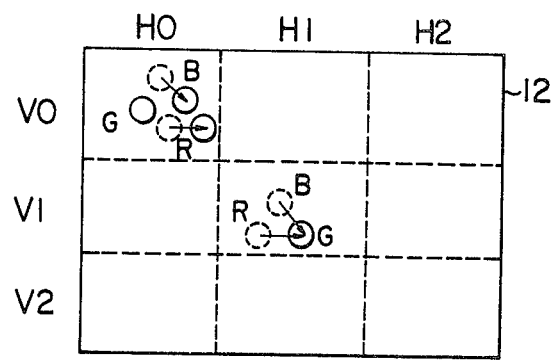
FIG. 5 illustrates that only the convergence distortion at the central zone can be corrected when the magnet assembly shown in FIG. 4 is used.

FIG. 7A shows a construction of the dynamic convergence magnet assembly 100 for the in-line gun type color CRT as shown in FIG. 7B. In the illustrated example, it comprises two four-pole magnets 101 and 102 and two six-pole magnets 103 and 104. The four-pole magnets 101 and 102 generate magnetic fields by electromagnetic coils 111 and 121 each having four coil portions as the magnets 21 and 22 of FIG. 4 do. The beams R and G are deflected by the magnetic fields in the directions shown by arrows in FIG. 7A like in the case of FIG. 4. The six-pole magnets 103 and 104 generate magnetic fields by electromagnetic coils 131 and 141 each having six coil portions and the beams R and B are deflected by the magnetic fields in the directions shown by arrows as are done by the magnets 23 and 24 shown in FIG. 4. Those four magnets are not rotatable around the beam axes unlike the static convergence magnet assembly shown in FIG. 4 but the diagonal beam deflection is attained by the combination of the vertical and horizontal beam deflections.

Figure 8A:
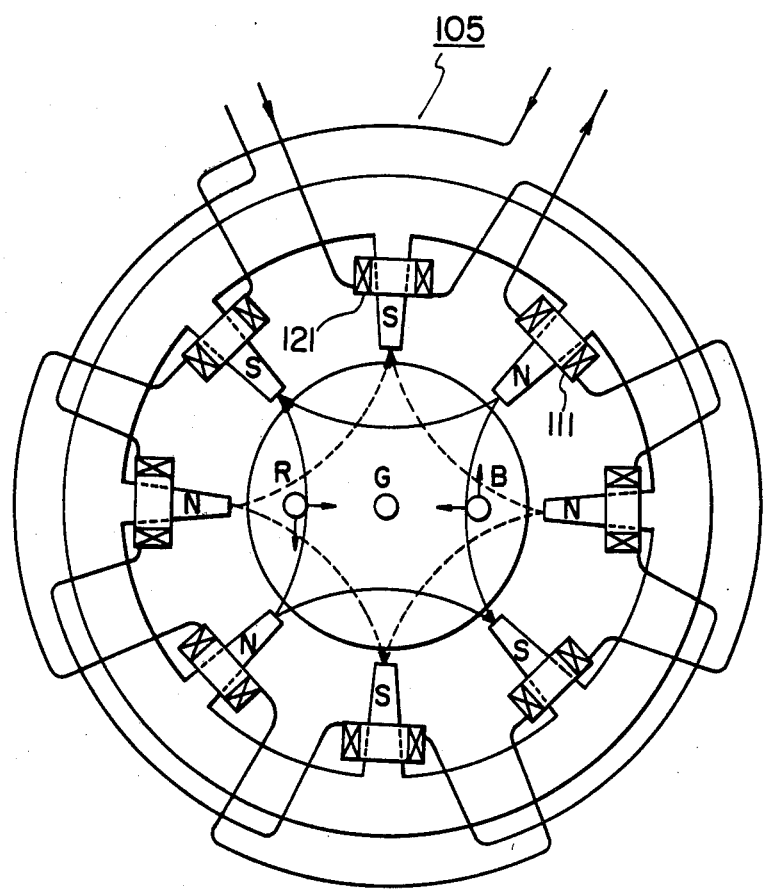
Figure 8C:
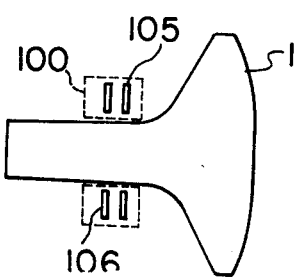
Figure 8B:
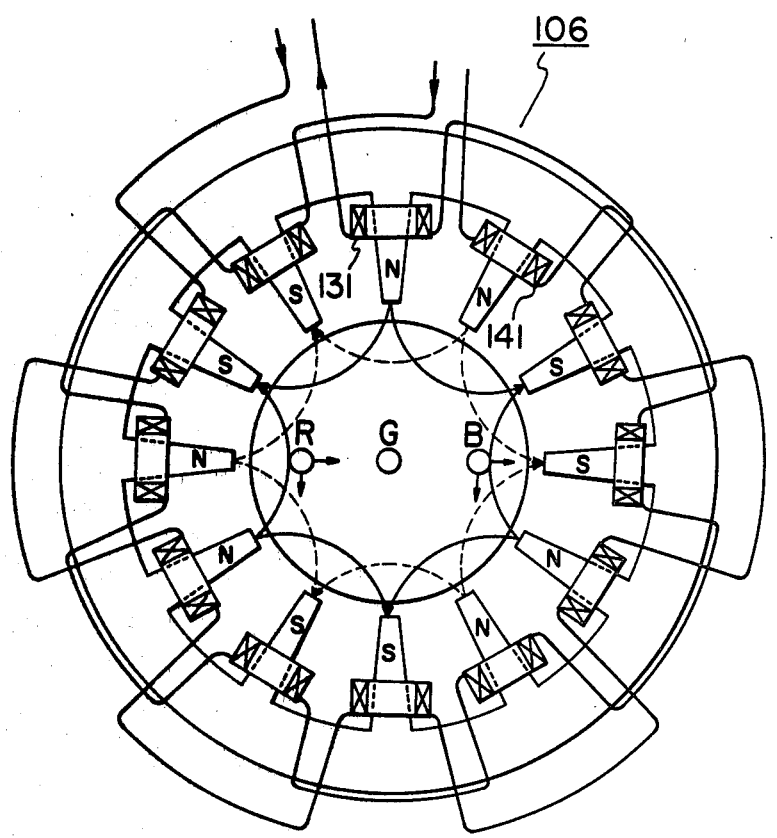

FIGS. 8A and 8B show another construction of a dynamic convergence magnet assembly 100 shown in FIG. 8C. In this example, only two magnets are used. A magnet 105 has the four-pole magents 101 and 102 shown in FIG. 7B assembled on a common core to form an eight-pole structure having the electromagnetic coils 111 and 121 arranged alternately, and a magnet 106 has the six-pole magnets 103 and 104 shown in FIG. 7B assembled on a common core to form a twelve-pole structure having the electromagnetic coils 131 and 141 arranged alternately. Accordingly, the magnet 105 provides a combined beam deflection of the beam deflections by the magnets 101 and 102 of FIG. 7B and the magnet 106 provides a combined beam deflection of the beam deflections by the magnets 103 and 104 of FIG. 7B. When the currents supplied to the four electromagnetic coils 111, 121, 131 and 141 are equal, the magnet assemblies of FIGS. 7 and 8 have the same beam deflection effect.

The magnet assemblies shown in FIGS. 7 and 8 are disclosed in Japanese Laid-Open Patent Application No. 51-71723 laid open on June 21, 1976 (corresponding to Dutch Patent Application No. 7414845 filed on Nov. 14, 1974)

Referring to FIG. 9, the convergence distortion correction circuit 200 and the adjustment circuit 300 shown in FIG. 6 are now explained. The convergence distortion correction circuit 200 comprises a zone address generator 210, an address selector 220, a digital correction data memory 230 and a digital-to-analog (D/A) converter circuit 210. The zone address generator 210 receives a sync signal (horizontal and vertical sync signals) from the sync separator circuit 7 and generates addresses for reading out the correction data for the respective zones of the display screen stored in the data memory 230 in accordance with the electron beam scan. The address selector 220 selectively supplies to the memory 230 the address generated by the zone address generator 210 or the address generated by the adjustment circuit 300. The data memory 230 stores therein the correction data necessary to correct the convergence distortion of the CRT. The D/A converter circuit 240 converts the correction data read from the data memory 230 to an analog signal to supply it to the dynamic convergence magnet assembly 100 as an exciting current.

On the other hand, the adjustment circuit 300 comprises a guide pattern generator 310, a console 320, a gate 350, an effective display area discriminator 360 and a processing unit (CPU) 380. The guide pattern generator 310 receives zone information from the convergence distortion correction circuit 200 and supplies, a signal for displaying a guide pattern on the display screen, to a video amplifier circuit 6. The console 320 supplies the correction data to the data memory 230 through the CPU 380 while specifying an address for storing the correction data to the data memory 230. The adjustment circuit 300 may include a programmable read-only memory (PROM) 330 for storing a copy of the data stored in the data memory 230 and a PROM writer 340 for writing the data in the PROM 330 under the instruction from the CPU 380. The gate 350 selects the read-in of the content of the data memory 230 to the adjustment circuit 300 or the read-out of the data of the adjustment circuit 300 to the data memory 230. The effective display area discriminator 360 receives through the video amplifier circuit 6 a video information signal generated from a display controller (not shown) for displaying any video information over the entire CRT display screen. For example, when the display screen is wholly displayed with white, the discriminator 360 receives at least one line of video signal components corresponding to R, G and B. When the screen is displayed with red, the discriminator 360 receives the video signal corresponding to R. The video signal is controlled to generate only at timing when the electron beam scans the effective display area of the CRT screen. By receiving such a video information signal, the discriminator 360 determines the presence or absence of the video signal in the respective zones and, if it is present, stores the information in flag bit fields of the data memory 230 at the associated addresses. The CPU 380 decodes an instruction from the console 320 and controls the operations of the respective units in accordance with a programmed control sequence to adjust the convergence distortion.

In the configuration shown in FIG. 9, the operation in the actual use of the CRT after the correction data has been written in the data memory 230 is explained.

The zone address generator 210 receives the sync signal from the sync separator circuit 7 and generates a zone address, which is currently scanned by the electron beam, of the display screen which are divided into a plurality of horizontal and vertical matric zones. During this operation, the address selector 220 is set to a position to transmit the zone address from the zone address generator 210 to the data memory 230 so that the correction data at the zone address corresponding to the scanning beam position is read from the data memory 230 and the correction data is converted to a current signal by the D/A converter circuit 240 to excite the dynamic convergence magnet assembly 100.

A method for writing the correction data to minimize the convergence distortions at the respective zones of the display screen to the data memory 230, that is, a method for adjusting the convergence distortion is now explained.

For the adjustment, it is necessary to first display an appropriate test pattern (guide pattern) for the adjustment on the display screen and it is desirable that the number of zones for which the adjustment of convergence distortion is to be made is as small as possible. However, in the actual use of the CRT, the number of zones into which the display screen is divided cannot be reduced because if the number of zones is small the correction data significantly changes from zone to zone and the convergence distortion at the boundary of the zones is conspicious. This trend is remarkable particularly in the vertical direction. Accordingly, it is desirable to obtain the correction data while limiting the number of zones to be subjected to the adjustment of convergence distortion to an extent which allows graspe of the trend of the overall convergence distortion of the display screen, and correction data for the remaining zones are interpolated by means of the correction data based on the adjustment. To this end, it is necessary to discriminate the zones to be subjected to the adjustment and the other zones. Based on the background described above, the characteristic configuration of FIG. 9 and the related adjustment steps are explained below.

In the data memory 230, a two-bit flag bit field is associated with each data storage field for storing convergence distortion correction data. Before starting the adjustment steps, the addresses of zones within an effective display of the display screen are determined by one of the flag bits (first flag bit). To this end, the first flag bits at all of the addresses are initially reset to "0" by the adjustment circuit 300 through the address selector 220 and the gate 350. The effective display area discriminator 360 receives through the video amplifier circuit 6 the video information signal from the display controller (not shown), while the addresses are scanned by the zone address generator 210, so that flags are set to the first flag bits through the effective display area discriminator 360, which responds to a signal level to cause "1" to be set when the video signal is present and "0" to be set when the video signal is absent or blanking. Since the video signal is distributed on the entire display screen, the zone addresses in the effective display area of the display screen can be identified by reading out the first flag bits. As the zone address areas corresponding to the display screen are thus determined, the addresses of the zones which are to be preferentially subjected to the adjustment are selected in accordance with an algorithm stored in the CPU 380 with a higher priority being put to corners, and "1"'s (flags A) are set to the first flag bits of the correction data memory 230 by the adjustment circuit 300. Since the first flag bits used to identify the effective display area of the display screen are not necessary in this stage, the first flag bits are used again.

As the addresses of the zones to be subjected to the adjustment are determined, the data memory 230 is again scanned by the output of the zone address generator 210, and the guide pattern generator 310 refers to the first flag bits of the data memory 230 and the phase of the zone address generator 210 to generate guide pattern signals (to be described later) for only the zones to be subjected to the adjustment. The guide pattern signals are sent to the video amplifier circuit 6. The guide pattern signal may have a form which facilitates the adjustment of convergence distortion. The first flag bits of the data memory 230 are also used as means for limiting the address shift when an address shift instruction is issued by the console 320 and identification means in producing the interpolation data.

It is desirable that the guide patterns displayed on the CRT are distinguished from each other in accordance with the sequence of adjustment by the operator. To this end, the other flag bits (second flag bits) of the data memory 230 are utilized. The CPU 380 sets a flag B to only one zone address in response to the address shift instruction from the console 320. The guide pattern generator 310 refers to the flag and supplies to the corresponding zone a guide pattern of a different type from those of other zones. As an example, the guide pattern displayed on the corresponding zone is flickered.

When the correction data is to be written in the data memory 230, it is efficient to indicate the directions of correction vectors for adjustment of convergence distortion on the display screen by a plurality of keys provided on a control panel of the console 320 and to cause the CPU 380 to calculate correction data for the indicated direction upon each keying operation, thereby updating the content of the data memory 230. For example, a program is prepared which causes the CPU 380 to calculate correction data effecting the beam shift or correction of 0.01 mm on the CRT screen by one keying operation (0.1 mm if ten keying operations). For that purpose, it is required that the CPU 380 counts the number of keying operations with respect to each key and the program performs the operation of (the count number)$\times$(a unit vector quantity). The correction associated with the indicated direction of correction vector need not always be attained by a single correction coil but it may be attained by a combination of a plurality of correction coils. If the vector can be decomposed, it is desirable that a man-machine characteristic is given a higher priority and the decomposition of the vector and the calculation of the updating quantity for the data memory 230 are done by the CPU 380.

When the adjustment of convergence distortions in the zones on which the guide patterns are displayed have been completed or correction data based on the result of adjustment have been written in the data memory 230 at the addresses corresponding to those zones, these correction data are used by the CPU 380 to produce correction data for the remaining zones in accordance with the programmed interpolation algorithm based on the correction data at the corresponding addresses. If the zones to be subjected to the adjustment of conversion distortion are relatively finely distributed, a low class interpolation algorithm such as linear approximation in two horizontal lines and two vertical lines can be used. For zones out of the effective display area but adjacent to the zones in the effective display area must be provided data interpolated from the data for the zones in the effective display area in order to prevent the affect to the zones in the effective display area.

In this manner, the correction of convergence distortions of the all zones is completed. The correction data stored in the data memory 230 can be copied and stored in the PROM 330. Thus, if the content of the data memory 230 is destroyed by the power-off, the data in the PROM 330 can be recopied to the data memory 230. When the PROM 230 and the data memory 230 are pin-compatible and packaged by sockets, the PROM 330 can be directly used as the data memory 2220. In this case, since the entire adjustment circuit 300 is not necessary, the adjustment circuit 300 may be taken off while leaving only the convergence distortion correction circuit 200.

Figure 10:
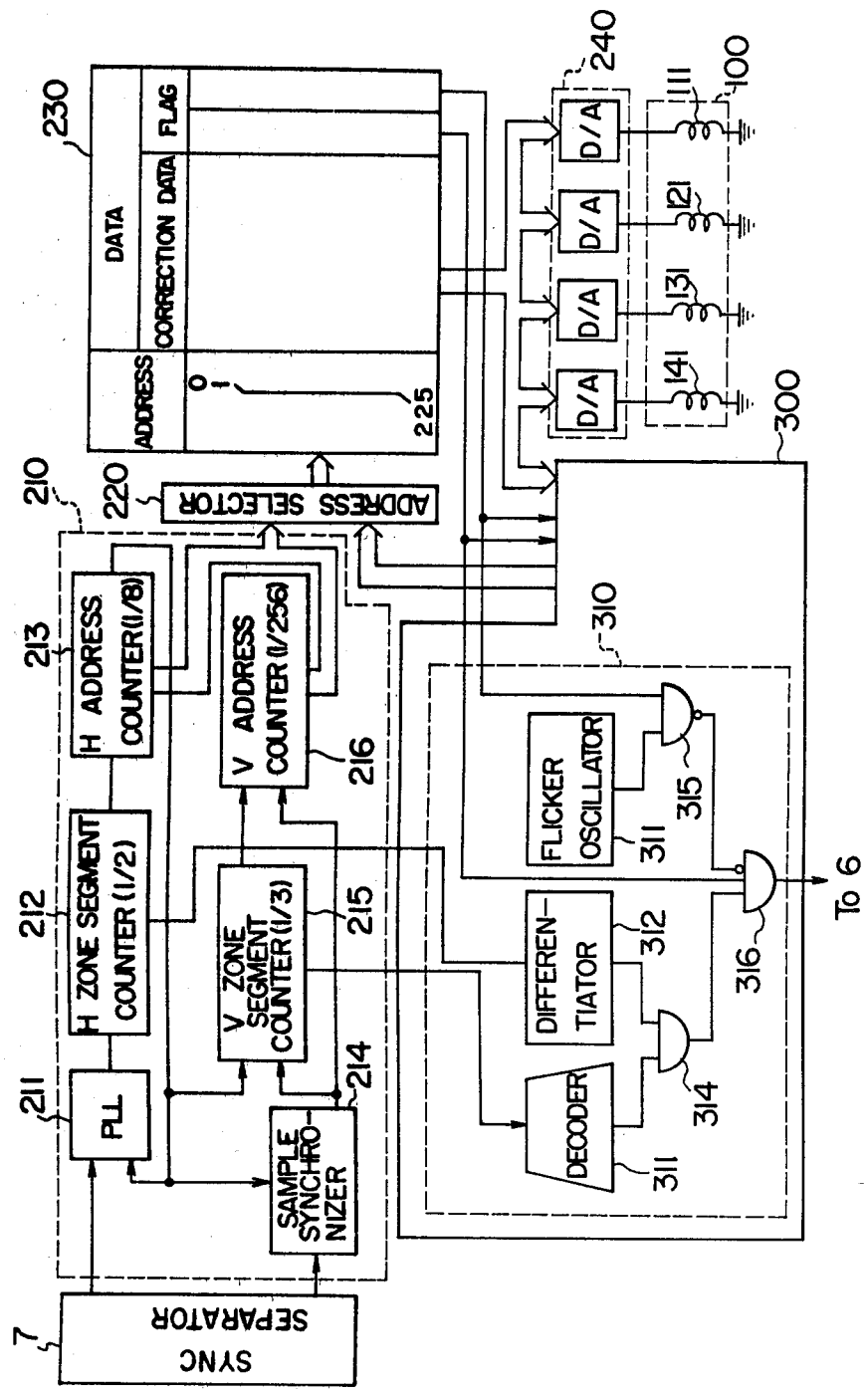
FIG. 10 shows a detail of a zone address generator and a guide pattern generator shown in FIG. 9.

FIG. 10 shows a detail of the zone address generator 210 and the guide pattern generator 310. The zone address generator 210 comprises a PLL 211, an H (horizontal) zone segment counter 212, an H address counter 213, a sample synchronizer 214, a V (vertical) zone segment counter 215 and a V address counter 216.

Figure 11:
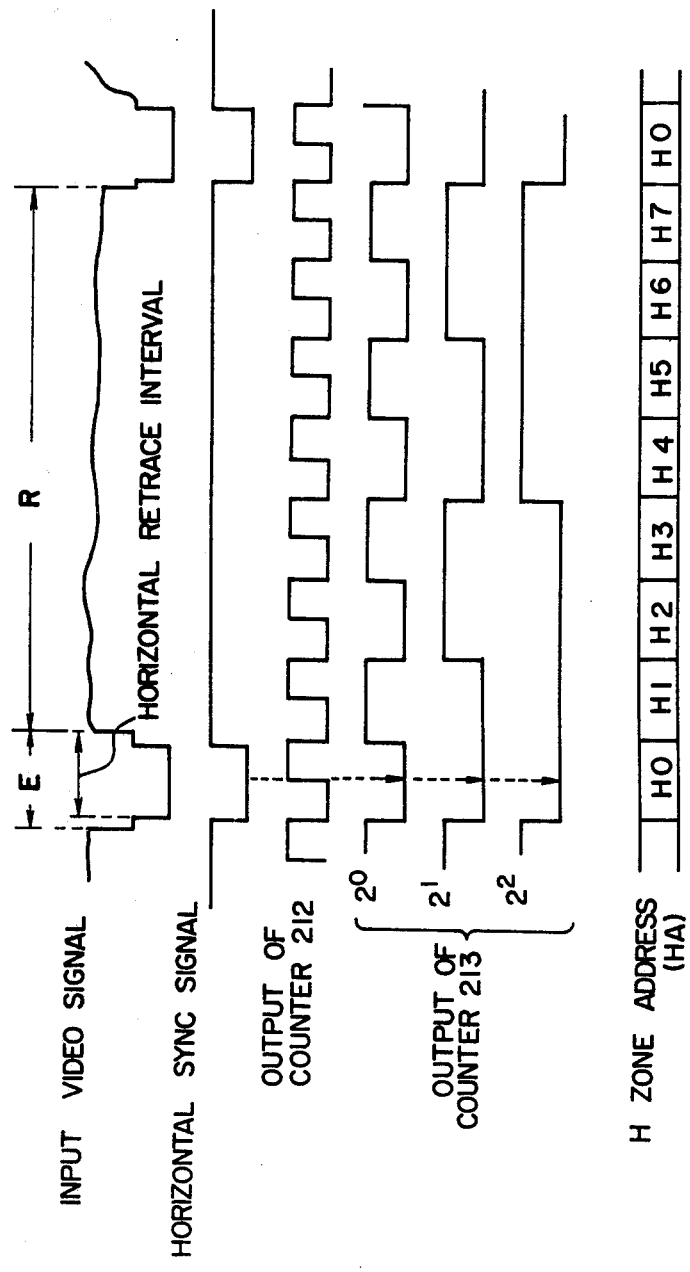
FIGS. 11 and 12 shows waveforms related to the zone address generator in horizontal and vertical zone addresses.
Figure 12:
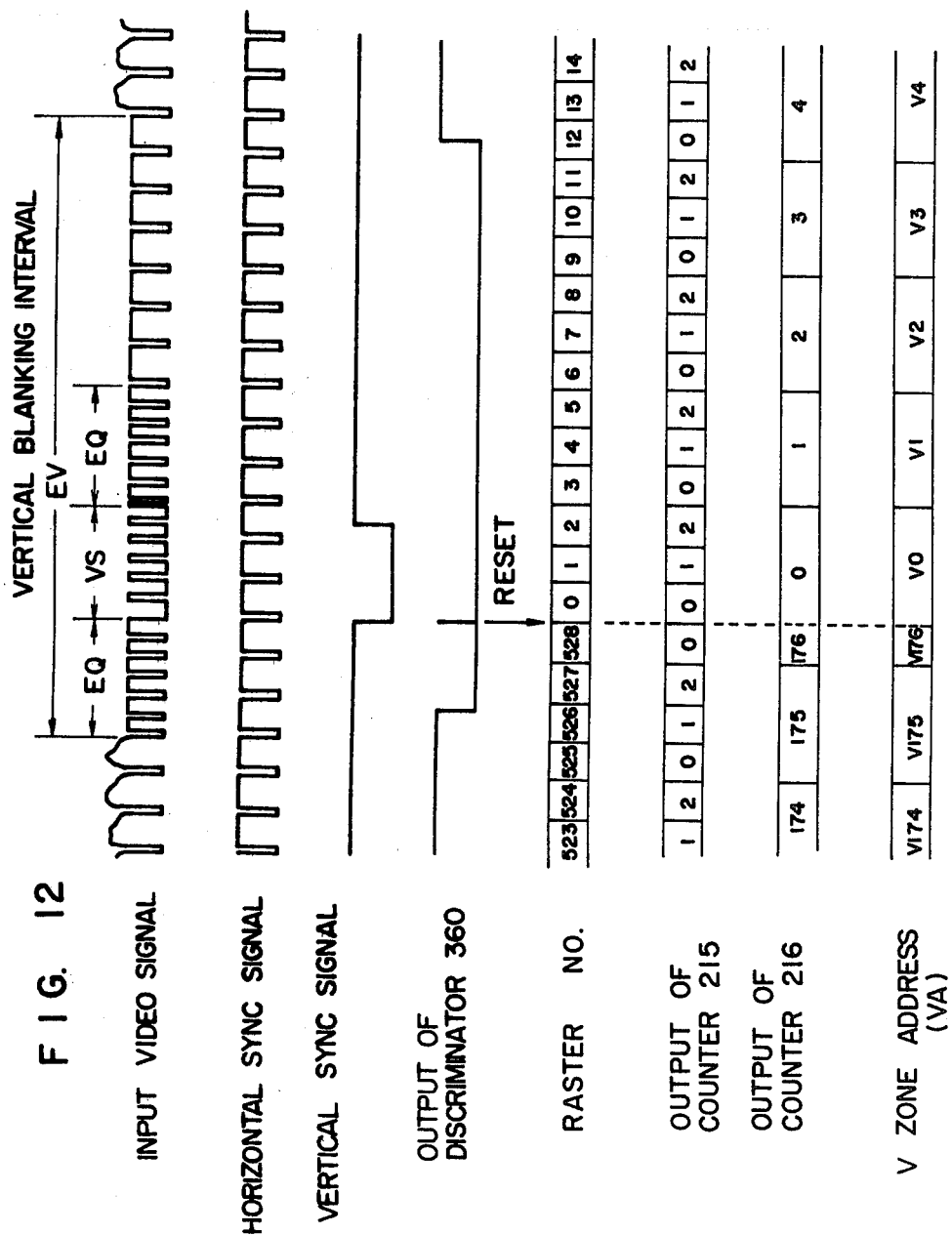
Figure 13:
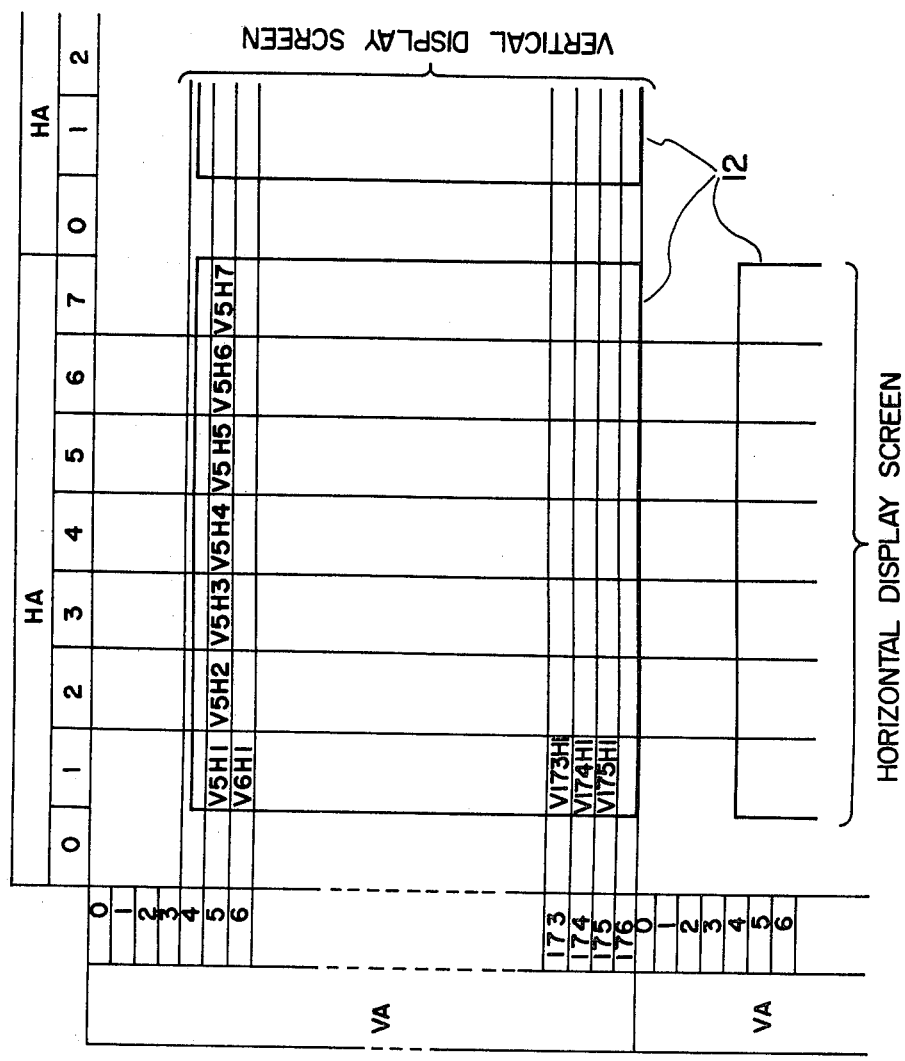
FIG. 13 shows a correspondence between the horizontal and vertical addresses and a display screen.

The PLL 211 produces a multiplication-of-21 oscillation frequency from a horizontal sync signal produced from the sync separator circuit 7 to cause the H zone segment counter 212 and the H address counter 213 to complete their cycles during the sync period. The frequency is synchronized with the horizontal sync signal for each cycle. The H zone segment counter 212 detects a midpoint of one horizontal zone, and the H address counter 213 sets the number of horizontal zone segments to eight and specifies an address of the horizontal zone addresses. The H address counter 213 includes three stages of shift registers for representing the horizontal zone address (HA) with three bits $2^0$ to $2^2$ (see FIG. 11). The V zone segment counter 215 sets one of the vertical zone segments by a unit of three rasters and the V address counter 216 generates a vertical segment address. The V zone segment counter 215 and the V address counter 216 are reset when the sample synchronizer 214 detects a leading edge of the vertical sync signal from the sync separator circuit 7 and cyclically generate the vertical zone addresses in synchronism with the vertical sync signal. FIGS. 11 and 12 show waveforms related to the zone address generator 210. In FIG. 12, the total number of rasters in the vertical direction is 529, and the V address counter 216 cycles the address from 0 to 176. FIG. 13 shows a correspondence between the horizontal zone addresses (HA) and the vertical zone addresses (VA), and the display screen. In the horizontal direction, HA0 of the addresses HA0 to HA7 is in a flyback erase region, and in the vertical direction, VA0 to VA3 and a portion of VA4 of the addresses VA0 to VA176 are in the flyback erase region, and hence they are not displayed on the display screen.

In the present embodiment, the zones are defined by a unit of eight horizontal segments and three vertical rasters although they are not restrictive.

Referring back to FIG. 10, the guide pattern generator 310 comprises a decoder 311, a differentiator 312, a flicker oscillator 313 and gates 314 to 316. The decoder 311, the differentiator 312 and the gate 314 detect the midpoint of the zone based on the outputs of the V zone segment counter 215 and the H zone segment counter 212 to produce a pulse, which is applied to a first input terminal of the AND gate 316. To a second input terminal of the AND gate 316 is applied the first flag bit (flag A) of the data memory 230. An output of the NAND gate 315 to which an output of the flicker oscillator 313 and the second flag bit (flag B) of the data memory 230 are applied is applied to an inverted input terminal of the AND gate 316. Accordingly, the AND gate 316 produces an output pulse (guide pattern pulse) when the flag A is present, and the guide pattern pulse is flickered when the flag B is present. These pulses are supplied to the video amplifier circuit 6.

Figure 14:
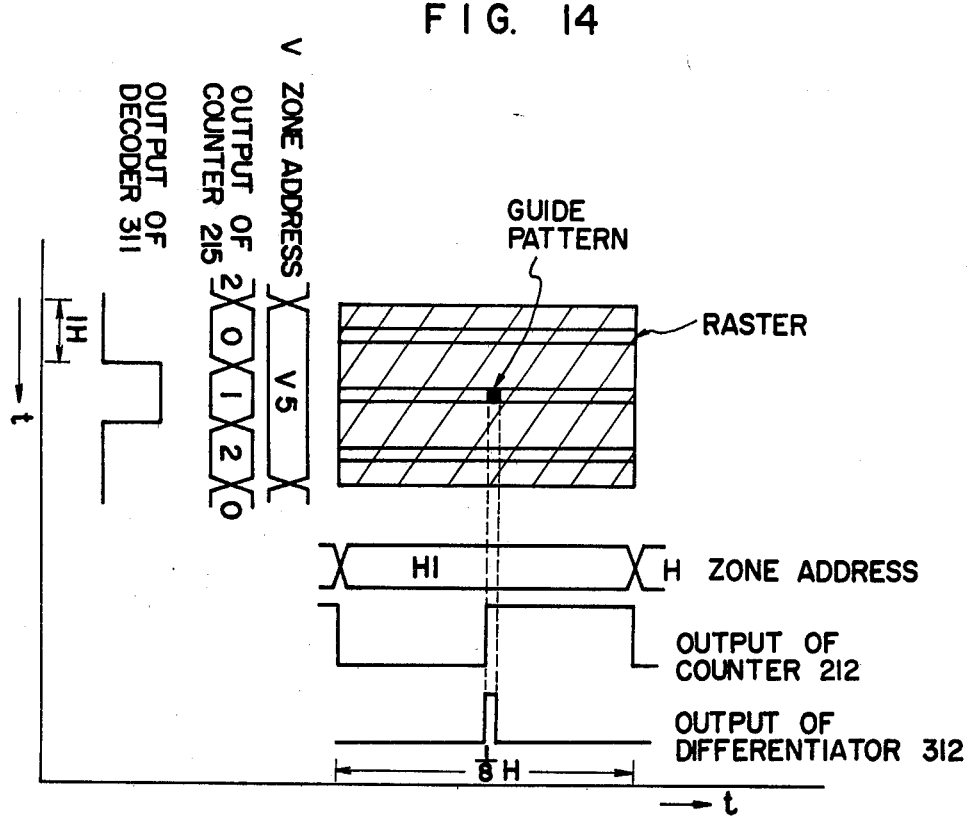
FIG. 14 shows operational waveforms of the guide pattern generator.
Figure 15:
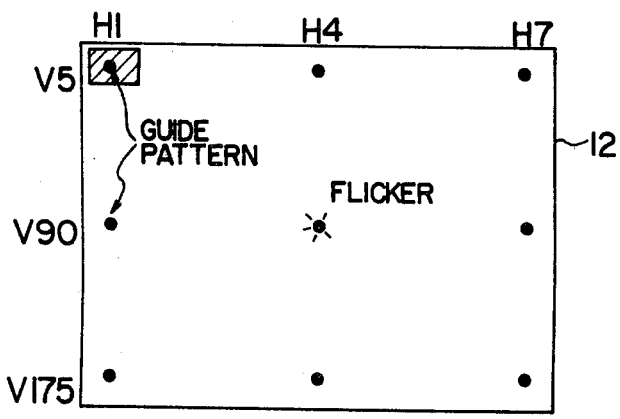
FIG. 15 illustrates an example of display of guide patterns.

FIG. 14 shows operational waveforms of the guide pattern generator 310 and FIG. 15 shows an example of display of the guide patterns on the display screen. In the example of FIG. 15, the guide patterns are displayed in the zones (H1, V5), (H4, V5), (H7, V5), (H1, V90), (H4, V90), (H7, V90), (H1, V175), (H4, V175) and (H7, V175), and the guide pattern in the zone (H4, V90) is flickered.

Figure 16:
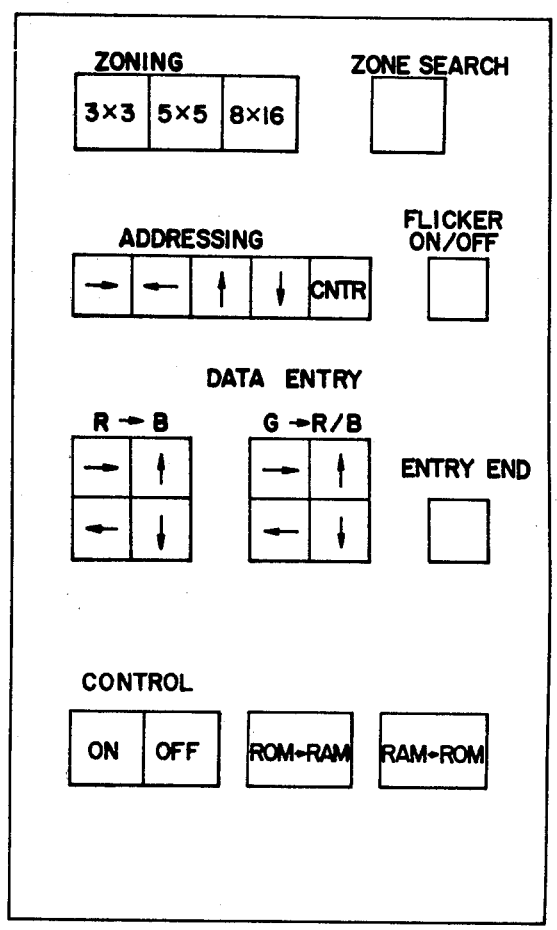
FIG. 16 shows a console shown in FIG. 9.

FIG. 16 shows an example of a control panel of the console 320 by functional unit.

A ZONE SEARCH switch is used to instruct the determination of the effective display area of the display screen. The first flag bits of the data memory 230 at the addresses corresponding to the zone addresses in the effective display area are set to "1" by the effective display area discriminator 360.

A three-key ZONING switch is used to select the number of the zones to be subjected to the adjustment of convergence distortion. Three zoning levels are provided in the illustration. In the example shown in FIG. 15, 3×3 zones are included. By selecting any one of the keys of the ZONING switch, "1"'s are written to the first flag bits of the data memory 230 corresponding to the addresses of the selected zones. The guide pattern generator 310 refers to the first flag bits to generate the predetermined guide pattern signals to be displayed.

A five-key ADDRESSING switch is used to instruct the shift of the address of the zone to be now subjected to the adjustment of convergence distortion. Referring to FIG. 15, when a key CNTR is first depressed, the zone address (H4, V90) is selected, and when a vertical up key is then depressed, the zone address (H4, V5) is selected, and when a horizontal left key is then depressed, the zone address (H1, V5) is selected. The amounts of shift of the horizontal zone address and the vertical zone address when the respective keys are depressed depend on the selection of the keys of the ZONING switch. The CPU 380 calculates the zone address upon each keying operation and sets "1" to the second flag bit of the data memory 230 corresponding to the zone address. The guide pattern generator 310 refers to the second flag bit to flicker the guide pattern displayed on the corresponding zone.

A FLICKER ON/OFF switch is used to stop the fliker of the guide pattern as required. The flicker stop function is not specifically illustrated because it can be readily implemented by those skilled in the art.

An eight-key DATA ENTRY switch is used to indicate the directions of correction vectors for the adjustment of convergence distortion and to update the content of the data memory 230. The switch comprises an R→B key set and a G→R/B key set. When one of the keys of the ADDRESSING switch is depressed, the guide pattern displayed on the corresponding zone is flickered. At this moment, no data has been written in the corresponding address of the data memory 230. When the guide pattern does not exhibit a white spot, the operator manipulates right, left, up and down keys (the directions being deflection directions of the R beam with reference to the B beam) of the R→B key set until the R beam and the B beam coincide to produce a yellow spot. When the yellow spot is produced, the operator then manipulates right, left, up and down keys (the directions being deflection directions of the G beam with reference to the yellow spot) of the G→R/B key set until the yellow spot and the G beam coincide to produce a white spot. For each keying operation, the CPU 380 operates to calculate correction data in accordance with a predetermined program so that the content of the data memory 230 for for each keying operation is updated and a current is supplied to related convergence coils through the D/A converter circuit 240 based on the updated content of the data memory 230. In this manner, final correction data is written or established in the address of the data memory 230 corresponding to the zone in question. The ADDRESSING switch is then manipulated to shift the zone address and similar operation is carried out with respect to the new zone.

More especially, correction data obtained through the manipulation of the R→B key set is assocated with the coils 111 and 121 shown in FIG. 7 or 8 while correction data obtained through the manipulation of the G→R/B key set is associated with the coils 131 and 141. The right and left keys in the R→B key set are used so that currents based on the correction data flow through the coil 111 in the direction of arrow shown in FIG. 7 or 8 and in a direction reverse thereto, respectively. In a similar manner, the down and up keys in the R→B key set are related to the coil 121, the left and right keys in the G→R/B key set to the coil 131, and the up and down keys in the G→R/B key set to the coil 141. As has been described earilet, the CPU 380 counts the number of keying operations with respect to each key and performs the operation of (the count number)×(a unit vector quantity).

Though the above example has employed the adjustment operation which includes a first step of coinciding the R beam with the B beam and a second step of coinciding the G beam with the R/B spot, there may be used a method which includes a first step of coinciding the R (or B) beam with the G beam and a second step of coinciding B (or R) beam with the G beam. This method may be convenient for the operator since both the steps are made with reference to the G beam. For that purpose, the DATA ENTRY switch may include an R→G four-way key set and a B→G four-way key set. In this case, it will be understood that each key should be related to not a single coil but two or more coils of the magnet assembly 100. Unit correction vector quantities are associated with the respective directing keys. A program is required which causes to the CPU 380 to perform the operation of (the count number of keying operations)×(the associated unit vector quantity) and to decompose the resultant vector data into correction data components for the related coils. This method can enhance the workability of adjustment since the number of keying operations will be decreased.

An ENTRY END switch is used to instruct the calculation of interpolation correction data to the CPU 380 in accordance with the programmed algorithm and the writing of the interpolation data in the addresses of the data memory 230 corresponding to the remaining zones. A ROM→RAM switch is used to instruct the copying of the data of the PROM 330 to the data memory 230, a RAM→ROM switch is used to instruct the copying of the data of the data memory 230 to the PROM 330, and an ON/OFF CONTROL switch is used to selectively validate or invalidate the overall console function.

As described hereinabove, according to the present invention, the convergence distortion of the color CRT is efficiently corrected. For example, when the data bit width of the correction data memory 230 is five-bit width (four bits plus one sign bit), a correction precision is as small as 1/16 of the uncorrected maximum convergence distortion. Thus, it can readily attain an appreciable limit of the convergence distortion (approximately 0.1 mm).

According to the present invention, the input signal necessary for the correction is the same video signal as that in the conventional color monitor and the dynamic convergence is attained without modifying the interface of the main unit. Accordingly, a high quality color monitor which is corrected for the convergence distortion can be employed.

Figure 17:
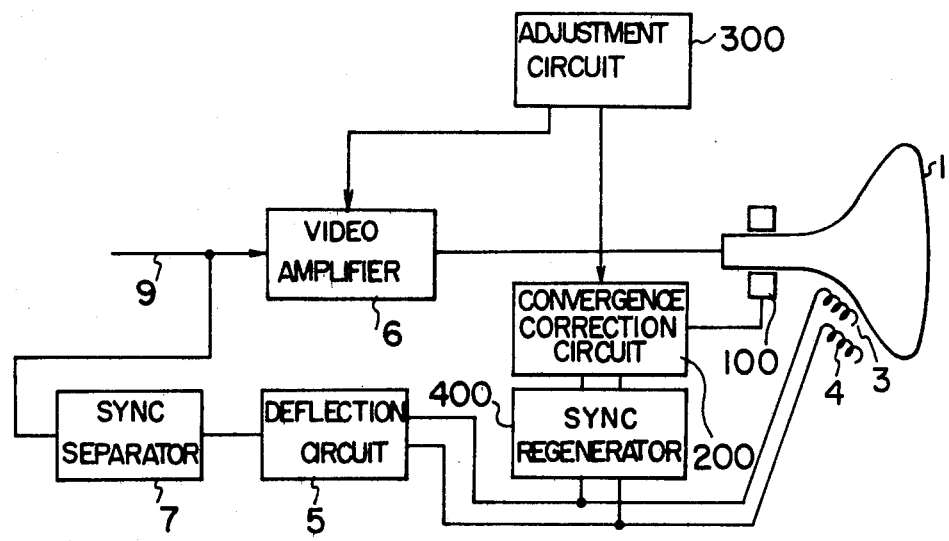
FIG. 17 shows a block diagram of another embodiment of the convergence distortion correction apparatus of the present invention.
Figure 18:
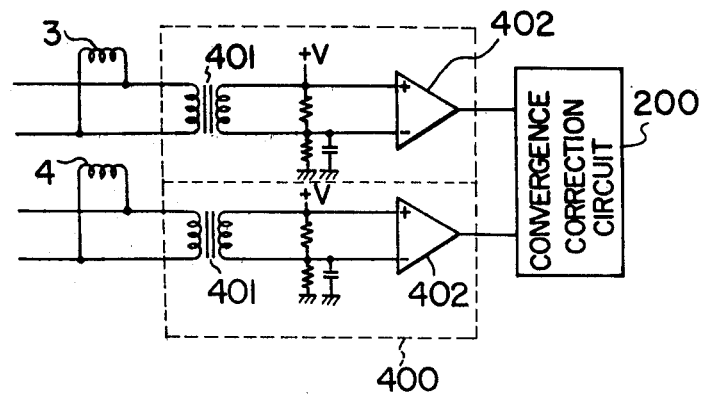
FIG. 18 shows a sync regenerator circuit shown in FIG. 17.

FIG. 17 shows a configuration of a further embodiment of the present invention. The feature of the present invention, to compare with the embodiment of FIG. 6, resides in that the sync signal to the convergence distortion correction circuit 200 is regenerated by a sync regenerator circuit 400 from drive signals for the horizontal and vertical deflection coils 3 and 4. The sync regenerator circuit 400 may be constructed by insulating transformers 401 and comparators 402 as shown in FIG. 18. The present embodiment can prevent missynchronization which may take place when the sync signal is regenerated by the sync separator circuit.

Figure 19:
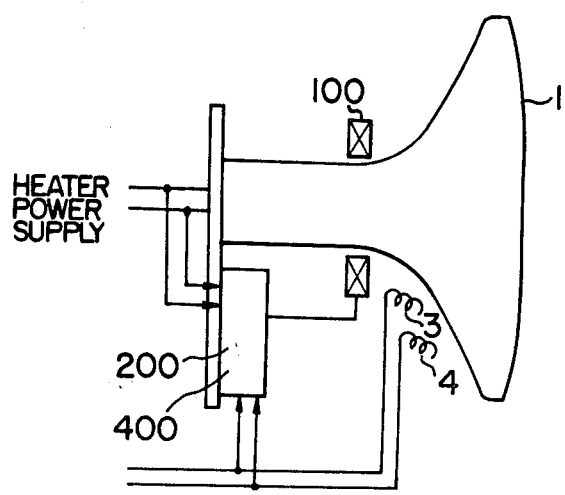
FIG. 19 shows a chart for explaining advantages of the embodiment of FIG. 17.

A constructual advantage of the present embodiment is apparent from a packaging diagram shown in FIG. 19. The dynamic convergence magnet assembly 100, the convergence distortion correction circuit 200 and the sync regenerator circuit 400, which are minimum functional unit necessary for the correction of the convergence distortion, are integrally mounted at a neck portion of the CRT 1 with the horizontal and vertical coils 3 and 4 and a power supply for the convergence distortion correction circuit 200 and the sync regenerator circuit 400 is shared with a heater voltage of the CRT 1. As a result a compatibility with the conventional CRT having no convergence distortion correction function is attained and a restriction in applying the present invention is materially relieved.

While the present invention has been described with reference to specific embodiments, it should be understood by those skilled in the art that various modifications can be made. For example, while the flag bit field of the data memory 230 has two bits in the illustrated embodiment, it may have only one bit (first flag bit) when it is not desired to flicker the guide pattern. While the flags are written into the first flag bits by the effective display area discriminator 360 prior to the adjustment of convergence distortion, this step is not necessary if the zones to be subjected to the adjustment of convergence distortion are appropriately selected. While the present invention has been described in connection with the specific dynamic convergence magnet assembly and the in-line electron guns, it should be understood that the present invention is applicable to a color CRT having other types of electron guns and/or dynamic convergence magnet assembly.

We claim:

1. A convergence distortion correction method for a raster-scanned color CRT including an electron gun assembly for generating a plurality of electron beams, a display screen and a dynamic convergence magnet assembly having a plurality of coils for correcting convergence distortions in the display screen of the electron beams, comprising:
    a first step of dividing the display screen of the CRT into a plurality of zones and repetitively generating addresses of the zones on the basis of a signal for raster scan regenerated from an input video signal;
    a second step of selecting addresses of zones to be subjected to the adjustment of convergence distortion from said plurality of zones and setting flags in flag bit fields associated with data storage fields of a digital memory at addresses specified by said selected zone addresses;
    a third step of generating guide pattern signals by referring to said flags of said digital memory while scanning said digital memory by the zone addresses, to display guide patterns on said selected zones of the CRT; and
    a fourth step of utilizing the displayed guide patterns to adjust convergence distortions in said selected zones and storing correction data based on the result of the adjustment in the data storage fields of said digital memory at the addresses corresponding to said selected zones.

2. A convergence distortion correction method according to claim 1, wherein said fourth step includes interpolating correction data for the zones other than said selected zones in a predetermined relation from the correction data for said selected zones and storing the interpolated correction data in the data storage fields of said digital memory at the addresses corresponding to said other zones.

3. A convergence distortion correction method according to claim 1 or 2, wherein the display of the guide patterns in said third step is made so that one of the guide patterns is displayed in different manner than the other guide patterns in a sequence of the adjustment of convergence distortion.

4. A convergence distortion correction method according to claim 3, wherein said one guide pattern is flickered to distinguish it from said other guide patterns.

5. A convergence distortion correction method according to claim 4, wherein each of the flag bit fields of said digital memory has first and second flags bits, said flags are set as first flags to the first flag bits of said digital memory at the address corresponding to said selected zones in said second step, and a second flag for flickering said one guide pattern is set to the second flag bit of said digital memory at the address corresponding to one of said selected zones on which said one guide pattern is to be displayed.

6. A convergence distortion correction method according to claim 1, wherein, prior to said second step, auxiliary flags are set to the flag bit fields of said digital memory at the addresses corresponding to the zone addresses in an effective display area of the display screen of the CRT, and in said second step, only ones of the auxiliary flags at the digital memory addresses corresponding to said selected zones are made effective.

7. A convergence distortion correction method according to claim 1 or 2, further comprising a step of copying and storing correction data of said digital memory in a read-only memory.

8. A convergence distortion correction method according to claim 7, wherein said digital memory and said read-only memory are pin-compatible and said digital memory is replaced by said read-only memory.

9. A convergence distortion correction apparatus for a raster-scanned color CRT including an electron gun assembly for generating a plurality of electron beams, a display screen and a dynamic convergence magnet assembly having a plurality of coils for correcting convergence distortions in the display screen of the electron beams, comprising:
  a video amplifier circuit for receiving an input video signal to supply a plurality of signals for color reproduction to said electron gun assembly of the CRT;
  sync signal generating means for receiving the input video signal to regenerate a sync signal therefrom;
  a convergence distortion correction circuit including a zone address generator for receiving the sync signal from said sync signal generating means to repetitively generate zone addresses of the CRT divided into a plurality of zones, a digital memory having data storage fields and associated flag bit fields, and an address selector having a first input terminal connected to said zone address generator and an output terminal connected to said digital memory; and
  an adjustment circuit including an operator-manipulated address specification section for supplying, addresses of selected ones of the plural zones of the CRT to be subjected to the adjustment of convergence distortion, to a second input terminal of said address selector to set flags to the flag bit fields of said digital memory at the corresponding addresses, a guide pattern generator for generating guide pattern signals based on the zone addresses from said address generator and said flags from said digital memory and causing guide patterns to be displayed in said selected zones of the CRT through said video amplifier circuit, an operator-manipulated correction data setting section for allowing an operator to adjust convergence distortions in said selected zones while watching the displayed guide patterns, and processing means for calculating correction data based on the result of the adjustment by said correction data setting section and transferring and writing the correction data to the data storage fields of said digital memory at the addresses corresponding to said selected zones.

10. A convergence distortion correction apparatus according to claim 9, wherein said processing means interpolates correction data for the zones other than said selected zones in a predetermined algorithm from the correction data for said selected zones and transfers and writes the interpolated correction data to the data storage fields of said digital memory at the addresses corresponding to said other zones.

11. A convergence distortion correction apparatus according to claim 9 or 10, wherein each of the flag bit fields of said digital memory has first and second flag bits, said flags being set as first flags to the first flag bits through said address specifying section, said adjustment circuit further includes an operator-manipulated address shift section for shifting the addresses of said selected zones, a second flag being set to the second flag bit of said digital memory at the address corresponding to a specific one of the addresses of said selected zones through said address shift section, and said guide pattern generator generates a flickered guide pattern signal in response to said first and second flags.

12. A convergence distortion correction apparatus according to claim 9, wherein said adjustment circuit further includes an effective display area discriminator for the display screen of the CRT, said discriminator receiving a predetermined video information signal from said video amplifier circuit when said digital memory is scanned by the zone addresses to set auxiliary flags to the flag bit fields at the corresponding addresses of said digital memory when the video signal is present, and said address specifying section validates only ones of said auxiliary flags of the flag bit fields at the addresses of said digital memory corresponding to said selected zones.

13. A convergence distortion correction apparatus according to claim 9 or 10, wherein said adjustment circuit further includes a read-only memory for copying and storing the content of said digital memory.

14. A convergence distortion correction apparatus according to claim 13, wherein said digital memory and said read-only memory are pin-compatible so that said digital memory can be replaced by said read-only memory, and said adjustment circuit is adapted to be taken away from the apparatus.

15. A convergence distortion correction circuit according to claim 9, wherein said sync signal generating means includes a sync separator circuit for separating and shaping the sync signal from said input video signal.

16. A convergence distortion correction apparatus according to claim 9, wherein said sync signal generating means includes a sync separator circuit for separating and shaping the sync signal from said input video signal, a deflection circuit for producing a deflection drive signal to be supplied to deflection coils of the CRT in response to said sync signal and a sync regenerator circuit for regenerating the sync signal from said deflection drive signal.

17. A convergence distortion correction apparatus according to claim 16, wherein said dynamic convergence magnet assembly, said convergence distortion correction circuit, said sync regenerator circuit and said deflection coils are integrally mounted on a neck portion of the CRT.

* * * * *